United States Patent
Chen

(10) Patent No.: US 7,155,261 B2
(45) Date of Patent: Dec. 26, 2006

(54) METHOD AND APPARATUS FOR SAVING BATTERY POWER IN A MOBILE DEVICE USING RECOVERY MECHANISM FOR CELL UPDATE PROCEDURE IN CELL_DCH STATE

(75) Inventor: Huan-Yueh Chen, Gi-Long (TW)

(73) Assignee: ASUSTek Computer Inc., Taipei (TW)

( * ) Notice: Subject to any disclaimer, the term of this patent is extended or adjusted under 35 U.S.C. 154(b) by 463 days.

(21) Appl. No.: 10/427,501

(22) Filed: May 1, 2003

(65) Prior Publication Data

US 2003/0207702 A1 Nov. 6, 2003

Related U.S. Application Data

(60) Provisional application No. 60/377,567, filed on May 3, 2002.

(51) Int. Cl.
  *H04Q 7/22* (2006.01)
(52) U.S. Cl. .................... 455/574; 455/343.3
(58) Field of Classification Search ................ 455/574, 455/343.2, 436
  See application file for complete search history.

(56) References Cited

U.S. PATENT DOCUMENTS

| | | | |
|---|---|---|---|
| 5,594,951 A | 1/1997 | Bellin | |
| 5,678,192 A | 10/1997 | Paavonen et al. | |
| 6,360,097 B1* | 3/2002 | Smith et al. | 455/434 |
| 6,751,472 B1* | 6/2004 | Muhonen | 455/553.1 |
| 2001/0018342 A1* | 8/2001 | Vialen et al. | 455/423 |
| 2002/0107025 A1* | 8/2002 | Oliveira | 455/452 |
| 2002/0197992 A1* | 12/2002 | Nizri et al. | 455/435 |

FOREIGN PATENT DOCUMENTS

| | | |
|---|---|---|
| EP | 0 833 533 A2 | 4/1998 |
| JP | 7162974 | 6/1995 |
| JP | EP 0833538 | 1/1998 |
| JP | 11088252 | 3/1999 |
| JP | 2001-275168 | 10/2001 |
| WO | WO 0027158 | 5/2000 |

OTHER PUBLICATIONS

3rd Generation Partnership Project, Technical Specification Group Radio Access Network, RLC protocol specification (release 1999).

(Continued)

*Primary Examiner*—Matthew D. Anderson
*Assistant Examiner*—Philip J. Sobutka
(74) *Attorney, Agent, or Firm*—Winston Hsu

(57) ABSTRACT

A method of conserving power in a mobile device during a cell updating procedure in a wireless communication system. The mobile device uses a first timer and a second timer to monitor its internal operations. If only one timer is running, a running timer is assigned to be the first timer. If both timers have no associated RABs, the first timer is started.

9 Claims, 2 Drawing Sheets

OTHER PUBLICATIONS

3rd Generation Partnership Project; Technical Specification Group Radio Acess Network; Requirements for support of radio resource management (release 1999).

3rd Generation Partnership Project; Technical Specification Group Radio Access Network: UE Procedure in Idle Mode and Procedures for Cell Reselection in Connected Mode (Release 1999).

Y.W. Chung Adaptive Algorithm for mobile terminal power on/off state management.

ETST: UMTS: RRC Protocol Specification (3G TS 25.331 v.5.0.0 release 4).

3rd Generation Partnership Project; Technical Specification Group Radio Access Network; Radio Resource Control (RRC); Protocol Specification (Release 5), 3GPP TS25.311, 2002/3, p. 132-138,156,157,202,203, V5.0.0.

* cited by examiner

METHOD AND APPARATUS FOR SAVING BATTERY POWER IN A MOBILE DEVICE USING RECOVERY MECHANISM FOR CELL UPDATE PROCEDURE IN CELL_DCH STATE

CROSS REFERENCE APPLICATION

This application claims priority from U.S. Provisional Patent Application No. 60/377,567 filed on May 3, 2002.

BACKGROUND

Once a mobile device is turned on, the mobile device searches, finds and selects a cell of the chosen public land mobile network (PLMN), turns to its control channel and camps on it. As long as the mobile device is power on, this cell selection and reselection is a continuous process. Especially, when the mobile device moves among cells. Inevitably, the mobile device has to disconnect its communication with the fading cell coverage and reconnect with a new suitable cell so that the mobile device can have a better signal. Based on connected mode radio measurements and cell reselection criteria, the cell reselection process of a mobile device includes selecting a more suitable cell and associated radio access technology (RAT). When a mobile device is in idle mode, URA_PCH, CELL_PCH or CELL_FACH state, it regularly performs cell reselection procedures to search for and camp on a better cell (i.e. cell has higher signal level) according to the cell reselection criteria.

FIG. 1 shows the states and procedures for cell reselection process in URA_PCH, CELL_PCH and CELL_FACH states of connected mode. Assume that the mobile device is in the Universal Mobile Telecommunication System (UMTS) Terrestrial Radio Access (UTRA) Radio Resource Control (RRC) connected mode 5, when a cell reselection is triggered 10, the mobile device starts to evaluate the cell reselection criteria based on radio measurements. And if a better cell using the same RAT is found, then that cell is selected. The mobile device goes back to the UTRA RRC connected mode 5. If the change of cell implies a change of RAT, the existing Radio Resource Control (RRC) connection is released, and the mobile device enters idle mode of the other RAT 20. If no suitable cell is found in the cell reselection procedure, the mobile device will go into the Cell Selection when leaving connected mode 25 and eventually enters an idle mode. Meanwhile when the radio link failure is triggered, the mobile device shall trigger the initial cell reselection procedure 15 in order to request re-establishment of the RRC connection. If the mobile device is unable to find a suitable cell for a period, the mobile device eventually enters an idle mode. If the mobile device finds a suitable cell, the mobile device goes back to the UTRA RRC connected mode 5.

On the other hand, when the mobile device successfully selects a suitable Universal Terrestrial Radio Access (UTRA) cell, the mobile device performs a cell reselection procedure and submits the CELL UPDATE message for transmission on the Uplink Common Control Channel (CCCH) of the selected cell.

According to the prior art, two timers, T314 and T315, are relevant to track either the radio link failure process or the Radio Link Control (RLC) unrecoverable error process in CELL_DCH state of connected mode. The value of timers T314 and T315 are broadcasted in the system information by network, and all the broadcasted timers value shall be stored at mobile device. All the established Radio Access Bearers (RABs), except signalling Radio Access Bearers (RABs) that are used to transfer signalling messages, shall be associated with one of the timers T314 or T315 by network, depending on how long the disconnection can be tolerated by the applications/services using this RAB. When only signalling Radio Access Bearers (RABs) are established, i.e. only RRC connection exists, these signalling RABs are associated with one of the timers T314 and T315. A radio link failure happens when the mobile device receives a plurality of consecutive "out of sync" signals from the physical layer, the mobile device starts the timer T313. If the mobile device receives successive "in sync" signals from its physical layer before the T313 expires, then the mobile device will stop and reset the T313 timer. If the T313 expires, then the mobile device enters a "Radio link failure" state, which the mobile device will clear the dedicated physical channel configuration and perform a cell update procedure. On the other hand, a Radio Link Control (RLC) unrecoverable error happens when the retransmission of a message has exceeded the maximum retries that invokes the RLC unrecoverable error procedure. Upon the triggering of the radio link failure or the unrecoverable error occurrence, either or both timers T314 or T315 will start to count. When both timers T314 and T315 expire, the mobile device will enter an idle mode.

However, according to the prior art, when the mobile device initiates a Cell Update procedure in CELL_DCH state due to a radio link failure or a RLC unrecoverable error, the mobile device of the prior art shall (1) start timer T314, if a Radio Access Bearer (RAB) associated with T314 is established and if the stored value of the timer T314 is greater than zero; or (2) start timer T315, if a RAB associated with T315 is established and if the stored value of the timer T315 is greater than zero; or (3) start timer T314, if there are no RAB associated with T314 nor any RAB associated with T315 is established, i.e. only signalling radio bearers are established, and if the stored value of the timer T314 is greater than zero. When the invoked timer(s) T314 and/or T315 are expired, the mobile device enters an idle mode. Before the invoked timer(s) T314 and/or T315 are expired, the mobile device shall perform Cell Update procedure to try to re-establish the failed radio link or the unrecoverable RLC connection. In addition, when the mobile device initials a Cell Update procedure in CELL_DCH state, if the stored value of both timers are equal to zero, the Cell Update procedure will release all its radio resources, inform the upper layers of the released connections and bearers, clear a plurality of variables and enter an idle mode. Moreover, if the stored value of the timer T314 is equal to zero, the Cell Update procedure will release all radio access bearers associated with T314. Similarly, if the stored value of the timer T315 is equal to zero, the Cell Update procedure will release all radio access bearers associated with T315.

Nevertheless, several undefined or not clear defined scenarios exist during the mobile device's Cell Update operation in the CELL_DCH state if a radio link failure or a RLC unrecoverable error happens. First, when the timer T314 is greater than zero (T314>0) with no associated RAB is established and the timer T315 is equal to zero (T315=0) with at least one associated RAB is established. Second, when T315 is greater than zero (T315>0) with no associated RAB is established and T314 is equal to zero (T314=0) but with at least one associated RAB is established. And last, when T315>0 with no associated RAB is established and T314=0 with no associated RAB is established. In the above three situations, if a radio link failure happens or a RLC unrecoverable error occurs, neither timer T314 nor T315 will be started when the mobile device initiates a Cell Update procedure in the CELL_DCH state. Therefore, if no suitable cell can be found, the mobile device will keep searching a suitable cell until the battery power is exhausted, since there exists no timer started to make the mobile device enters idle mode while expiring.

SUMMARY

Because the requirements of cell re-selection operations in other modes are more strictly than it does in an idle mode, it makes a mobile device keep searching for a suitable cell more frequently and consume more power in these modes during the cell re-selection procedure than it does in an idle mode. Instead of continuous operating in the cell reselection procedure in these modes during the above-identified situations, the mobile device should be able to enter the idle mode until the environment changes to save more power.

Following drawings with reference numbers and exemplary embodiments are referenced for explanation purpose.

DETAIL DESCRIPTION OF THE INVENTION

Figure 1:
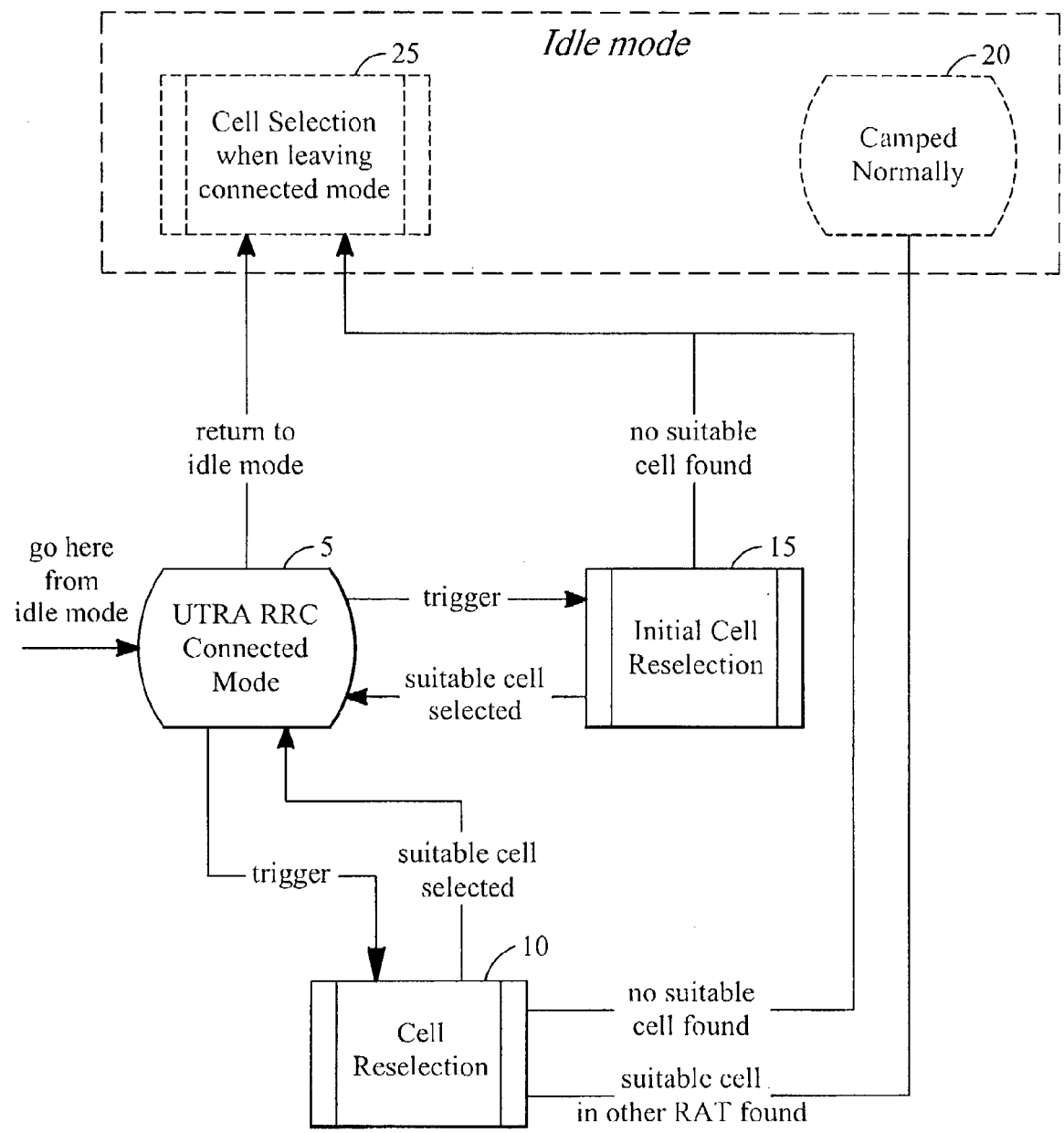
FIG. 1 illustrates the mobile device UTRA RRC connected mode cell reselection process for URA_PCH, CELL_PCH and CELL_FACH state.
Figure 2:
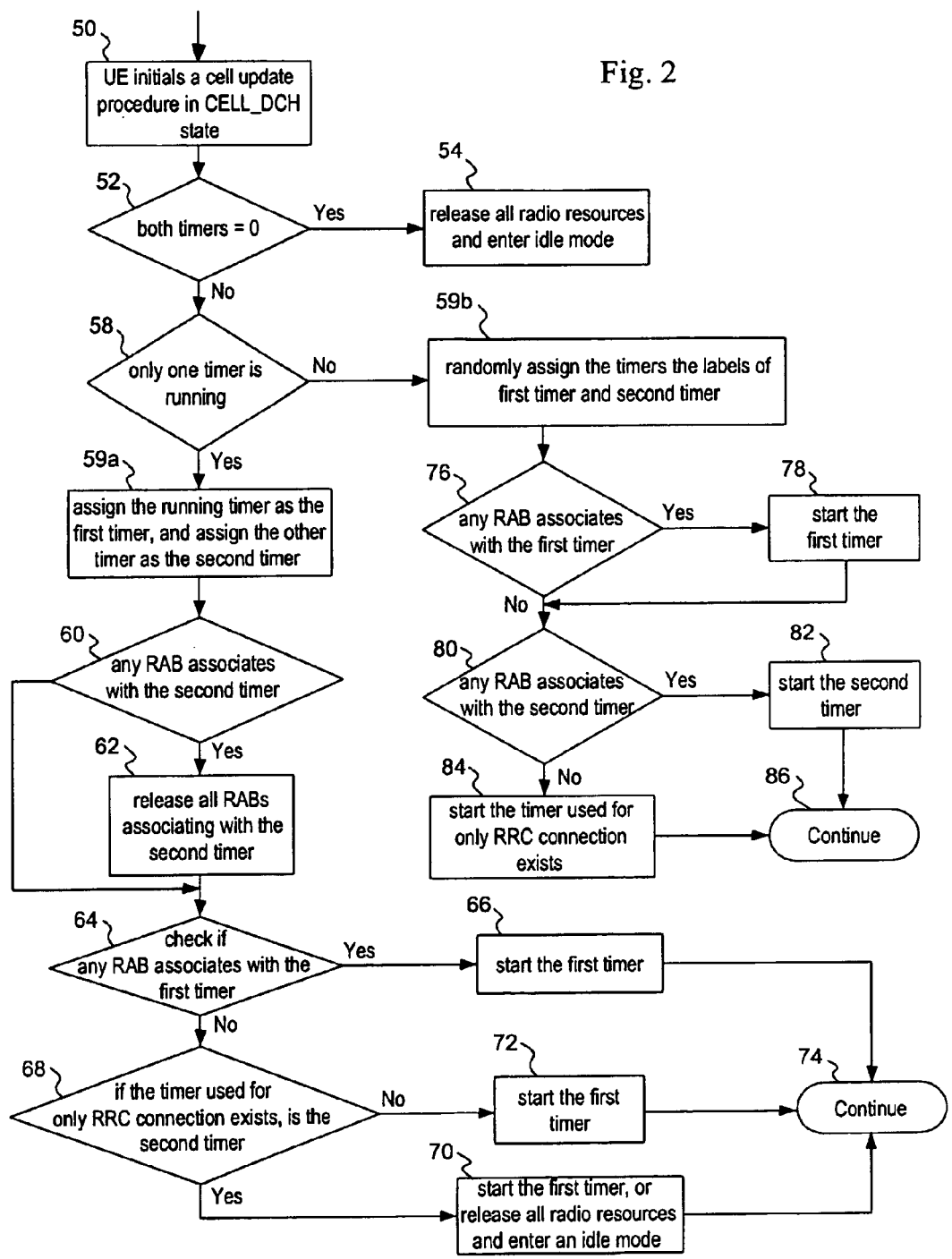
FIG. 2 illustrates the brief logical flowchart of how the mobile device initials a Cell updated procedure in CELL_DCH state.

This invention develops an enhanced process for a mobile device to handle the failure of the radio link or the occurrence of a RLC unrecoverable error in CELL_DCH state. FIG. 2 illustrates the logical flow of this invention. Once the mobile device initials a Cell Update procedure in CELL_DCH state 50, the invented process checks if both timers, T314 and T315, are not running by examining the stored value for both timers (T314=T315=0) 52, if the condition T314=T315=0 is true, then the mobile device releases all its radio resources and enters an idle mode 54. Next, the process checks if there is only one timer running at Step 58. When it is, then the process assigns the running timer as the first timer and the non-running timer as the second timer Step 59a. On the other hand, if both timers are running, then the process will randomly assign one timer as the first timer and the other as the second timer as specified in Step 59b. Under the only one timer is running situation, the process further checks if the second timer has any radio access bearer (RAB) associated with it as specified in Steps 60. If there is no RAB associated with the second timer, then the mobile device goes to logical step 64. If the second timer has at least one RAB associated then the mobile device shall release all RABs associated with the second timer Step 62. Next, at Step 64 the process further checks if any RAB is associated with the first timer, if there is, the process starts the first timer then exits Steps 66 and 74. Of course, if there is no RAB associated with the first timer, the process will check if the timer, used only for existing RRC connections (i.e. only signalling radio bearers are established), is the second timer Step 68, if it isn't, then starts the first timer Step 72. Otherwise, the process shall either start the first timer or release all radio resources and enter an idle mode Step 70.

Refer back to the logical Step 59b while both timers are running, for example T314>0 and T315>0, then the process will go to Step 76, at this stage, the mobile device already randomly assigned one of the two timers as the first timer and the other as the second timer. In Step 76, the mobile device checks if the first timer has any RAB associated with it, if it does the mobile device starts the first timer 78. Step 78 will lead to Step 80. Meanwhile, if the first timer doesn't have any RAB associated with it, then the process will go to Step 80. At Step 80 the process checks if the second timer has any RAB associated with it, if it does then the process starts the second timer and exits Steps 82 and 86. Otherwise, if the second timer does not have any RAB associated with it, the mobile device will start the timer used only for existing RRC connections and exits Steps 84 and 86.

This new invention will cover the situations covered by the prior art and it also covers few situations undefined or not clear defined by the prior art. For example, first, if the timer T314 has stored value larger than zero (T314>0) without any associated Radio Access Bearer (RAB) being established and the timer T315 is equal to zero (T315=0) with at least one associated RAB being established, according to the new process referring to FIG. 2, the condition of logical Step 58 of FIG. 2 is true, which leads to the Step 60. Since the second timer T315 has RAB(s) associated with it, the mobile device will release all T315 associated RABs in Step 62 and start the first timer T314 Steps 64 and 66.

Next, if T315>0 without any associated RAB is established and T314=0 with at least one associated RAB is established. Follows the logical flow of FIG. 2, at the step 58, because the first timer T315>0 and the second timer T314=0, the process will check if the second timer has any RAB associated with it in Step 60. Because the second timer (T314) has associated RAB(s) established that results in Step 62, the process release all RABs associated with the second timer T314 Step 62 and then goes to Step 64. At this point, the process will check if any RAB associates with the first timer T315 Step 64, because the answer is no, the process further checks if the timer, used only for existing RRC connections, is the second timer T314 (i.e. equal to zero). If no, then the first timer T315 is started in Step 72. Otherwise, the process shall either start first timer T315, or release all radio resources and directly enter the idle mode.

Last, in the case of T315>0 without any associated RAB is established at the same time T314=0 without any associated RAB is established, the invented process also provides a clear solution for the undefined state. After the step 58, because the first timer T315>0 and the second timer T314=0, the process will check if the second timer has any RAB associated with it in Step 60. Because the second timer (T314) has no associated RAB(s) established that results in Step 64. At this point, the process will check if any RAB associates with the first timer T315 Step 64, because the answer is no, the process further checks if the timer, used only for existing RRC connections, is the second timer T314 (i.e. equal to zero). If no, then the first timer T315 is started in Step 72. Otherwise, the process starts first timer T315, or releases all radio resources and enters an idle mode Step 70.

What is claimed is:

1. A method for saving battery power in a receiver of a mobile device during a cell updating procedure in a wireless communication system, the mobile device using timer 314 and timer 315 to monitor its internal operations and the mobile device entering an idle mode when both timer 314 and timer 315 expire, the method comprising:

determining a trigger event occurring in a particular state of the mobile device; and when only timer 315 is running, releasing all radio bearers and entering an idle mode when timer 314 and timer 315 both have no associated RABs.

2. The method as claimed in claim 1, wherein the trigger event occurs when a radio link failure happens in CELL_DCH state.

3. The method as claimed in claim 1, wherein the trigger event occurs when a radio link control unrecoverable error happens in CELL_DCH state.

4. A method for saving battery power in a receiver of a mobile device during a cell updating procedure an a wireless communication system, the mobile device using timer 314 and timer 315 to monitor its internal operations and the mobile device entering an idle mode when both timer 314 and timer 315 expire, the method comprising:

determining a trigger event occurring in a particular state of the mobile device; and when only timer 314 is running:

releasing all radio resources associated with timer 315 and starting timer 314 when timer 314 has no associated RABs and when timer 315 has at least one associated RAB.

5. The method as claimed in claim 4, wherein the trigger event occurs when a radio link failure happens in CELL_DCH state.

6. The method as claimed in claim 4, wherein the trigger event occurs when a radio link control unrecoverable error happens in CELL_DCH state.

7. A method for saving battery power in a receiver of a mobile device during a cell updating procedure in a wireless communication system, the mobile device using timer 314 and timer 315 to monitor its internal operations and the mobile device entering an idle mode when both timer 314 and timer 315 expire, the method comprising:

determining a trigger event occurring in a particular state of the mobile device; and when only timer 315 is running:

releasing all radio resources and entering an idle mode when timer 315 has no associated RABs and when timer 314 has at least one associated RAB.

8. The method as claimed in claim 7, wherein the trigger event occurs when a radio link failure happens in CELL_DCH state.

9. The method as claimed in claim 7, wherein the trigger event occurs when a radio link control unrecoverable error happens in CELL_DCH state.

* * * * *